United States Patent
Risheq

(10) Patent No.: US 7,059,790 B2
(45) Date of Patent: Jun. 13, 2006

(54) KEYBOARD AND METHOD OF MAKING THE SAME

(76) Inventor: Tareq Risheq, 27825 Noah Ct., Suite B, Laguna Niguel, CA (US) 92677

(*) Notice: Subject to any disclaimer, the term of this patent is extended or adjusted under 35 U.S.C. 154(b) by 20 days.

(21) Appl. No.: 10/713,549

(22) Filed: Nov. 14, 2003

(65) Prior Publication Data

US 2005/0105951 A1    May 19, 2005

(51) Int. Cl.
*B41J 5/08* (2006.01)
(52) U.S. Cl. .............. 400/491; 400/491.1; 341/22
(58) Field of Classification Search ............ 400/472, 400/490, 491; 341/22
See application file for complete search history.

(56) References Cited

U.S. PATENT DOCUMENTS

| | | | | |
|---|---|---|---|---|
| 5,145,270 A | * | 9/1992 | Darden | 400/488 |
| 5,260,512 A | * | 11/1993 | Chomette et al. | 84/644 |
| 5,513,824 A | * | 5/1996 | Leavitt et al. | 248/118.3 |
| 5,741,182 A | * | 4/1998 | Lipps et al. | 463/36 |
| D402,643 S | * | 12/1998 | Grassel | D14/457 |
| 5,893,540 A | * | 4/1999 | Scott | 248/118 |
| 5,944,533 A | * | 8/1999 | Wood | 434/322 |
| 6,454,627 B1 | * | 9/2002 | Mak | 446/369 |
| 6,582,330 B1 | * | 6/2003 | Rehkemper et al. | 473/570 |
| 6,585,162 B1 | * | 7/2003 | Sandbach et al. | 235/462.44 |
| 6,595,786 B1 | * | 7/2003 | Horiuchi et al. | 439/74 |
| 6,644,605 B1 | * | 11/2003 | Tyner | 248/118.1 |
| 6,664,949 B1 | * | 12/2003 | Amro et al. | 345/168 |
| 6,708,228 B1 | * | 3/2004 | Meyers et al. | 710/5 |
| 6,824,321 B1 | * | 11/2004 | Ward et al. | 400/479 |

FOREIGN PATENT DOCUMENTS

AU    2002100300 A4 *    5/2002

OTHER PUBLICATIONS 3-in-1 Football Remote, RadioShack Corporation, Owner's manual, 4 pages. (2002).

* cited by examiner

*Primary Examiner*—Daniel J. Colilla
*Assistant Examiner*—Dave A. Ghatt
(74) *Attorney, Agent, or Firm*—Knobbe, Martens, Olson & Bear, LLP

(57) ABSTRACT

A method and an apparatus for communicating data to a remote device, the apparatus comprising a keyboard having a plurality of keys. The lower surface of the keyboard is attached to an object along at least a portion of the lower surface of the keyboard. The object is adapted for providing a cushioned region between the keyboard and a resting-place. The remote device comprises at least one of a personal computer (PC), television (TV), an organizer, cable box, satellite receiver, and radio or stereo equipment. The resting-place is typically a portion of a human body, such as a lap or thigh region, or palm(s) of a hand(s). The keyboard communicates to the remote device via a wired or wireless link to allow use at home, hotel, or office.

20 Claims, 10 Drawing Sheets

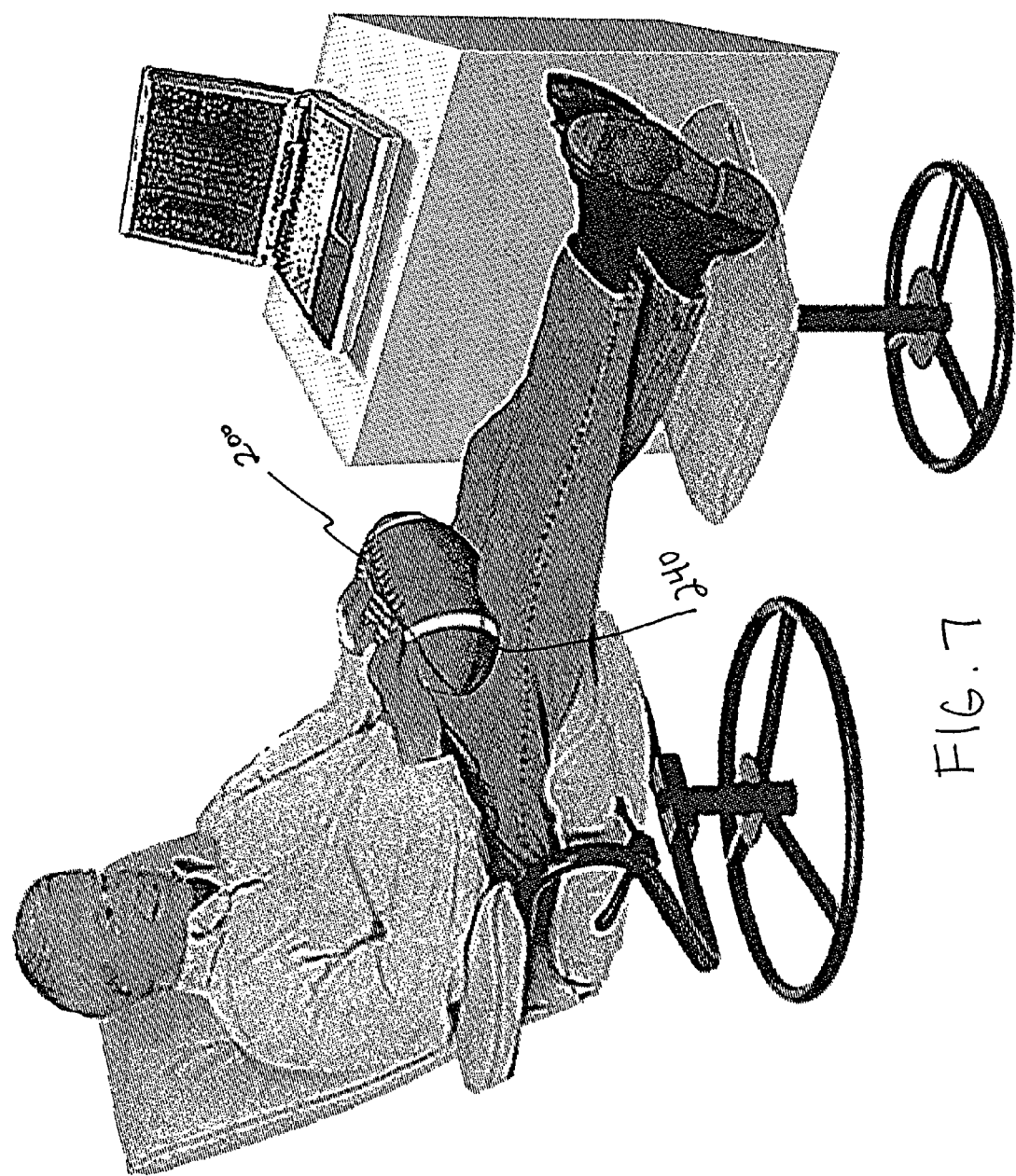

KEYBOARD AND METHOD OF MAKING THE SAME

BACKGROUND OF THE INVENTION

1. Field of the Invention

The present invention relates to keyboards and, in particular, to a wired or wireless keyboard that is comfortable when placed on a portion of a person's body, such as the thighs or lap region.

2. Description of the Related Art

Computers are well-known and are generally provided with a standard keyboard, a display (e.g., a monitor), and various interface connections for enabling the computer to be electrically coupled to other devices, such as input/output devices (disk drives, printers, and the like) and communication links (e.g., telephone lines) and is configured to receive power from a power line. However, standard computers are disadvantageous because of their large size and inability to be portable. Furthermore, standard personal computer keyboards tend to be large and bulky. The keyboards are electrically connected to the computer via wiring. The portability of the keyboards is limited by the length of the wiring, and the keyboard is not comfortable when placed in a user's lap.

Portable computers are known which are relatively small and convenient to carry and use in transit. Such computers are small enough to be placed on one's lap, thereby justifying their characterization by the term "laptop" computers. Computers of this type are usually provided with a standard personal computer keyboard, a display, a portable power supply (e.g., rechargeable batteries) and various interface connections for enabling the computer to be electrically coupled to other devices, such as input/output devices (disk drives, printers, and the like) and communication links (e.g., telephone lines). Portable computers are disadvantageous in that the entire computer is portable. The keyboard is permanently fixed to the computer. Furthermore, many users find that it is uncomfortable to place the "laptop" computer in their lap, because of the weight, discomfort contours, and heat generated by such a computer.

Accordingly, it is desirable to have an easily portable, comfortable, and aesthetically desirable keyboard for use with a computer or other electronic devices.

SUMMARY OF THE INVENTION

The invention provides an apparatus for communicating data to a remote or detached device. The apparatus comprises an alphanumeric keyboard comprising a plurality of keys, the keyboard having a lower surface. The keyboard is configured to communicate data representative of alphanumeric information to the device. The apparatus further comprises an object attached to the keyboard along at least a portion of the lower surface of the keyboard, the object being adapted for providing a cushioned region between the keyboard and a resting place. In another embodiment, the apparatus comprises means for generating alphanumeric characters, the character generation means being configured to communicate data representative of alphanumeric information to the device. The apparatus further comprises means for cushioning the generation means onto a resting place. The cushioning means is located substantially between the character generation means and the resting place.

The invention further provides a method of making an alphanumeric keyboard. The method comprises configuring a transmitter to communicate data representative of alphanumeric information to a detached device. The method further comprises connecting the transmitter to the alphanumeric keyboard. The method further comprises attaching a cushioned object to at least a portion of a lower surface of the alphanumeric keyboard.

The systems and methods have several features, no single one of which is solely responsible for its desirable attributes. Without limiting the scope as expressed by the claims that follow, its more prominent features will now be discussed briefly. After considering this discussion, and particularly after reading the section entitled "Detailed Description of the Invention" one will understand how the features of the system and methods provide several advantages over traditional systems and methods.

BRIEF DESCRIPTION OF THE DRAWINGS

FIG. 7 illustrates an exemplary usage of the keyboard in accordance with one embodiment of the invention.

DETAILED DESCRIPTION OF THE INVENTION

Embodiments of the invention will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1A:
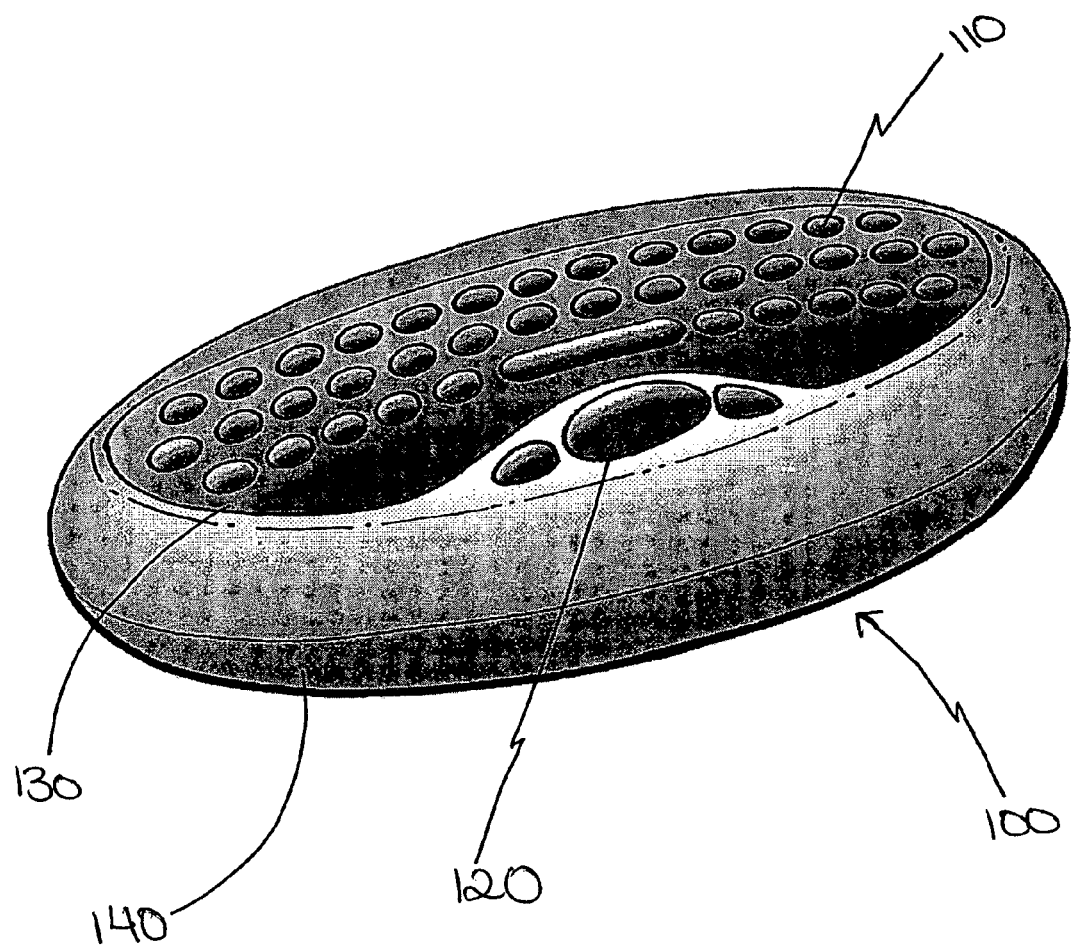
FIGS. 1A–1B are perspective views of keyboards in accordance with embodiments of the present invention.

As noted above, FIG. 1A illustrates a perspective view of a keyboard in accordance with one embodiment of the invention. As shown in FIG. 1A, a keyboard 100 comprises a plurality of keys 110 having a full function 104/105 keys as in conventional keyboards, such as those used with computers or with audio/video devices, such as a TV set. The keyboard 100 may further comprise a subset of key(s) 120 for performing functions typically associated with a computer mouse, e.g., for directly pointing to a particular location on a computer or video display. For example, the keyboard 100 may comprise media keys, such as Volume+, Volume−, Mute, Previous, Next, Stop, Play/Pause, and Select. The keyboard 100 may additionally or alternatively comprise Internet keys, such as Back, Forward, Stop, Refresh, Search, Home, Favorites, Email, Calc, and My Computer. In this embodiment, the keyboard 100 further comprises an upper surface 130 that is configured to be of sufficient hardness to allow proper detection of a pressing of one or more of the keys 110 by a user. For example, the surface 130 may comprise a material such as plastic, fiberglass, or any other material that provides adequate support for detection of pressing of the keys 110. The keyboard 100 further comprises a lower surface 140 that is configured to provide a cushioning region between the upper surface 130 and any object (not shown in this figure) with which the lower surface 140 may be in contact, such as a person's knee(s), thigh(s), palm, or lap regions. For example, the lower surface 140 may comprise any flexible or shock-resistant material such as self-skinning urethane, polyurethane, santoprene, fabric/straw combination, and others. Further, the keyboard 100 may be elliptical or circular in shape in the horizontal plane, as shown in FIG. 1A. To improve the aesthetic and/or functional attributes of the keyboard 100, the projection of its physical shape in the horizontal plane may be designed to resemble any other shape such as triangular, trapezoidal, square, rectangular, or any irregular shape.

Figure 1B:
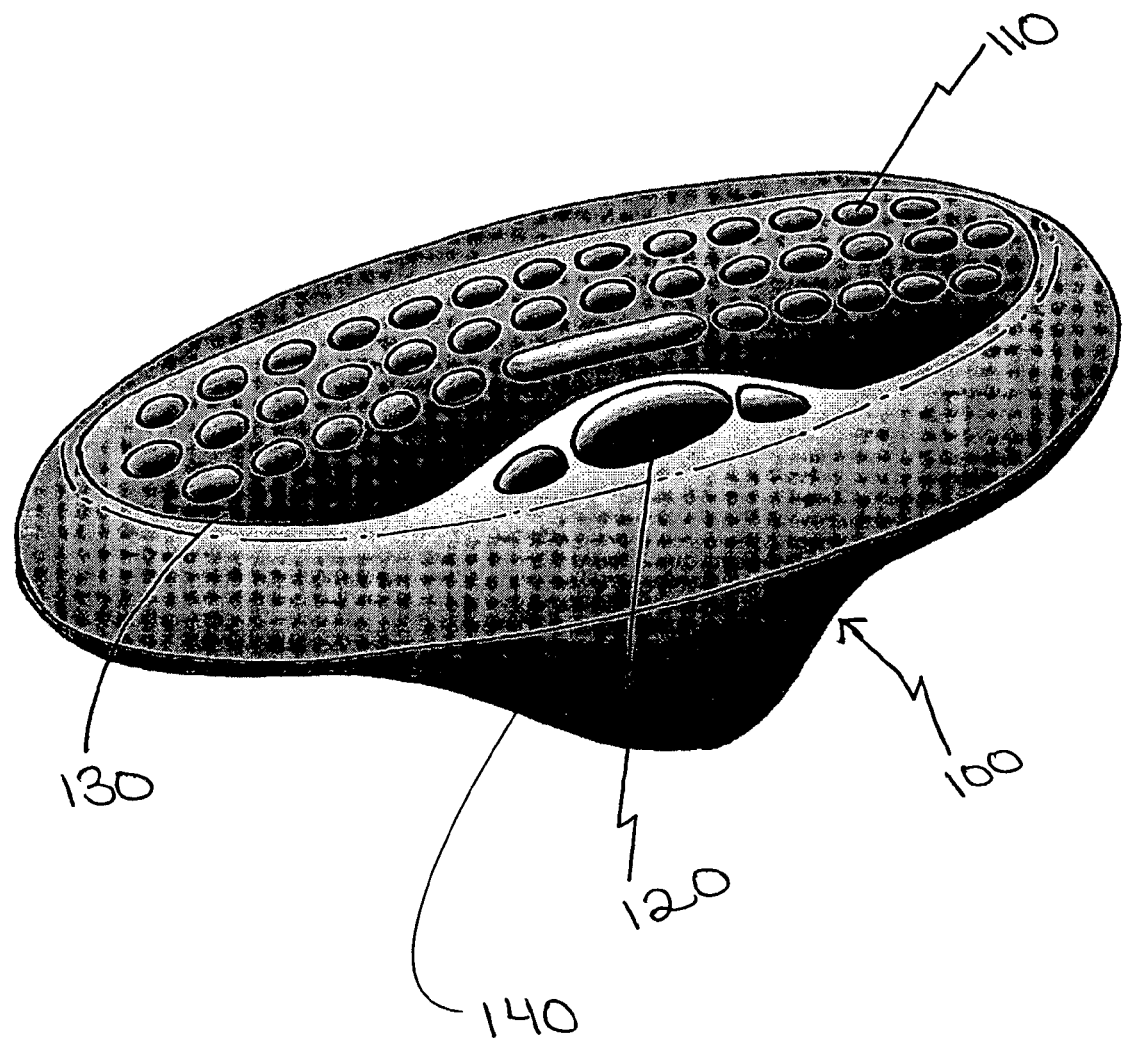

As noted above, FIG. 1B illustrates an embodiment that is similar to that illustrated in FIG. 1A, except for the shape of the lower surface 140. To further enhance the comfort of the placement of the keyboard 100 in this embodiment, the lower surface 140 is contoured to comfortably fit with alignments of the lap or closely positioned thighs of a person. For example, the lower surface 140 may be shaped as having a V or U shape in a medial-vertical geometric plane. In all other respects, the keyboard 100 of the embodiment of FIG. 1B is similar to the embodiment of the keyboard 100 of FIG. 1A.

Figure 2A:
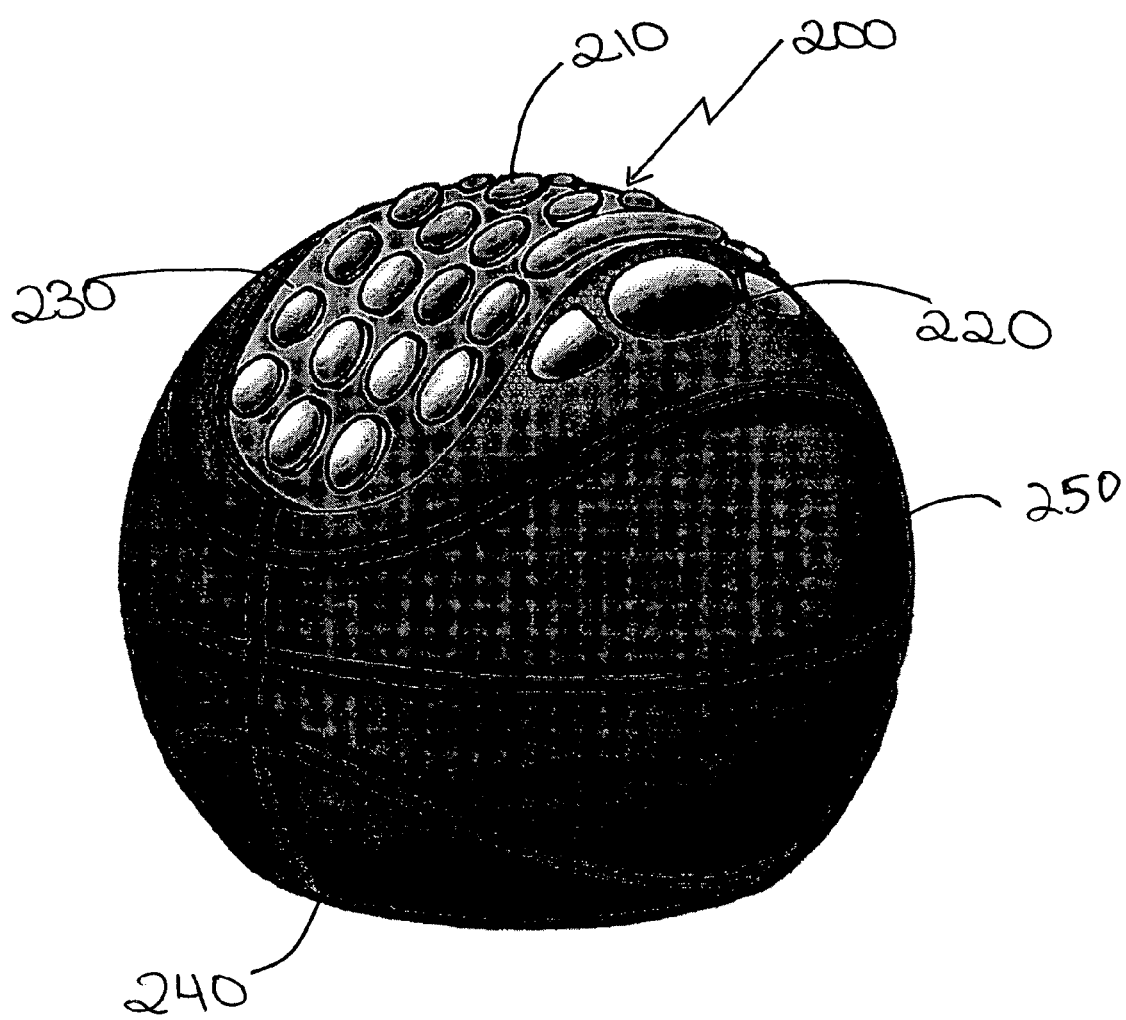
FIGS. 2A–2D are perspective views of keyboards in accordance with embodiments of the present invention.

In another embodiment, the invention provides a keyboard 200 mountable on various physical shapes, as illustrated in FIGS. 2A, 2B, 2C, and 2D. As shown in FIG. 2A, the keyboard 200 is embedded in a basketball for use by a person as an input device to communicate instructions to a controlled device, such as a personal computer (PC), television (TV), an organizer, cable box, satellite receiver, radio or stereo equipment, or any other interactive device that may be controlled via an input device, such as a keyboard, mouse, and/or remote controller. As described in connection with FIGS. 1A and 1B above, the keyboard 200 comprises a plurality of keys 210, a mouse/trackball 220, and an upper surface 230. A lower surface 240 is indicated as the region that is typically in contact with the user's body during operation of the keyboard. The basketball may be any type of basketball having an exterior layer 250 comprising, for example, rubber or leather material surrounding or tightly housing an inner chamber (not exposed in this figure). The keyboard 200 is placed exteriorly to the inner chamber using sealing material (such as a resin or rubber) to maintain the inner chamber airtight. In this embodiment, the basketball may be fully or partially inflated with air to achieve a desired level of comfort to operate the keyboard 200 when placed on the user's lap area. In one embodiment, it maybe desirable to house the keyboard 200 in a basketball having the exterior layer 250 comprising material such as a common cloth or fabric that may or may not be airtight. In such an embodiment, instead of air, the basketball may be filled with any cushioning material such as cotton, polyester, silicone, rubber, resin, straw, wooden chips, and combinations thereof. As shown in FIG. 2A, the lower surface 240 of the basketball is somewhat flattened or recessed indicating a less than complete filling of the basketball, thereby allowing a customized contouring of the basketball when in contact with the user's body. The flexible lower surface 240 offers an advantage of enhanced comfort to the user, and may provide a healthy or stress-release benefit by allowing the user to squeeze the cushioned basketball to message the user's hands during or after typing on the keyboard.

Figure 2B:
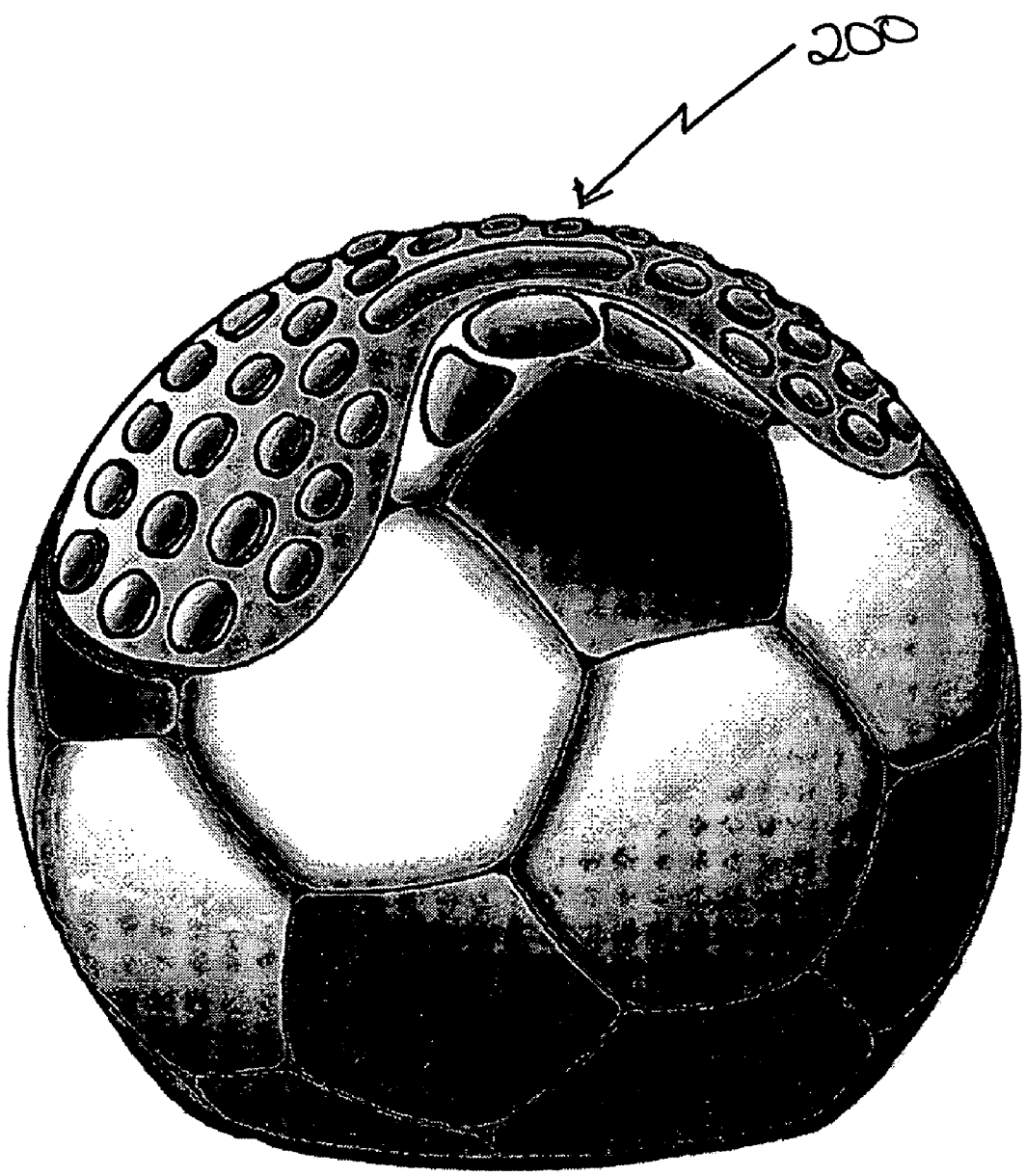
Figure 2O:
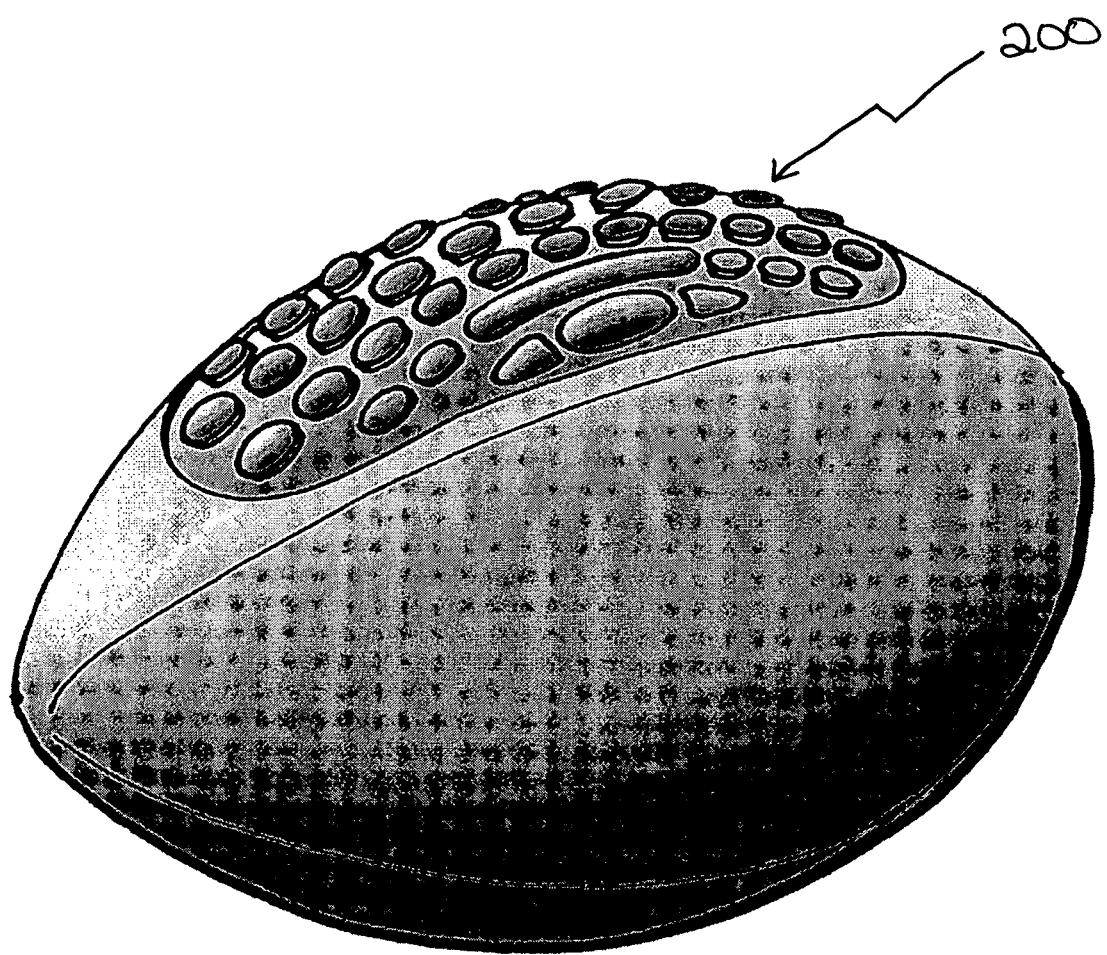
Figure 2D:
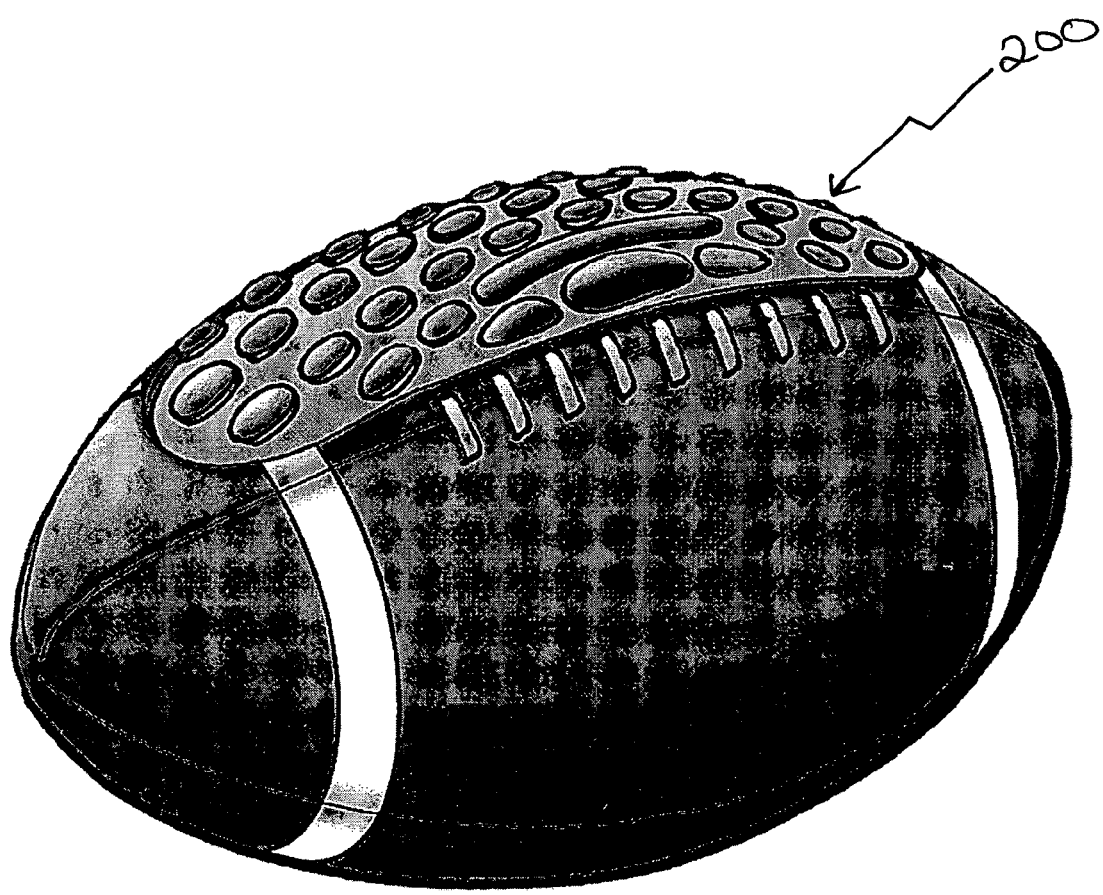

As shown in FIGS. 2B, 2C, and 2D, the invention provides the keyboard 200 in a manner similar to its placement in the basketball of FIG. 2A, except that, instead of a basketball, a different type of ball is used to mount the keyboard 200. More particularly, FIG. 2B shows the keyboard 200 mounted on a soccer ball, FIG. 2C shows the keyboard 200 mounted on a rugby ball, and FIG. 2D shows the keyboard 200 mounted on a football. It is to be understood that these figures show illustrative shapes that should not be restrictive on the scope of the invention. In other words, the invention provides a keyboard that may be mounted in any desirable 2 or 3 dimensional objects to offer benefits associated with objects other than conventional flat keyboards. Placement of the keyboard is not limited to sport objects, but may be implemented in recreational or entertaining objects, such as toys or similar objects.

Figure 3:
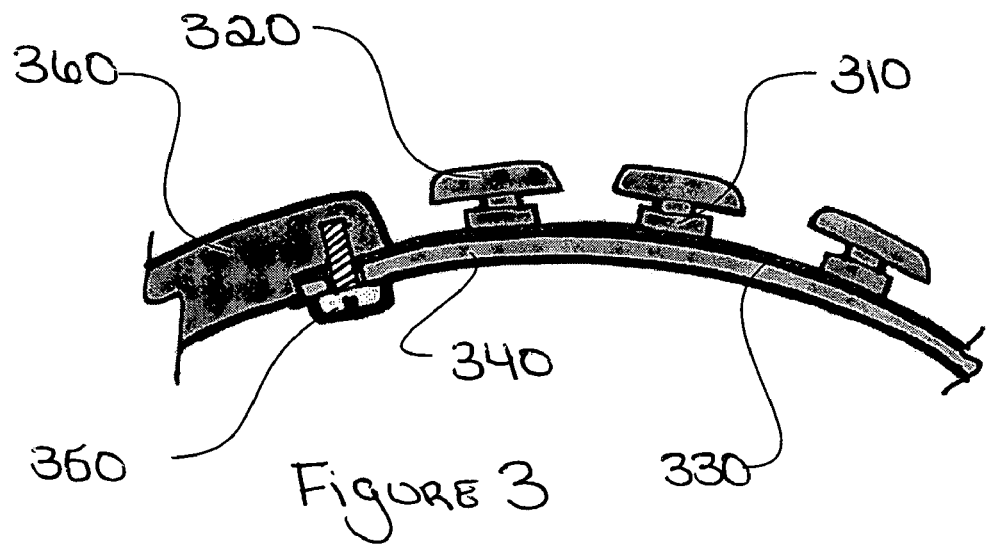
FIG. 3 is a front cutout view of a portion of an exemplary keyboard in accordance with one embodiment of the invention.

FIG. 3 is a front-cutout view of a portion of an exemplary keyboard in accordance with one embodiment of the invention. As shown in FIG. 3, the keyboard 100 or 200 (hereinafter "200") comprises a plurality of keys having a switch 310 covered by a keycap 320, which are made in accordance with key switches and caps in conventional flat keyboards. The switches 310 are small devices used to actually detect "keystrokes", that is, the finger motions indicating that a key has been pressed. The switches respond to mechanical motion by creating an electrical signal that tells the keyboard's internal circuitry that "a key was pressed". The keys are mounted on an upper surface 330 comprising a solid material of sufficient firmness to support pressure applied by a user onto the keys during operation, e.g., any type of resin or plastic, such as pressure-formed Kapton that may be commercially available from the Dupont Company. The upper surface 330 may positioned onto and be supported by a middle plate 340 for providing additional support during operation of the keys. The middle plate 340 may comprise any material that is typically used in conventional keyboards, such as plastics, metals, or other moldable material. As illustrated in the above description, the keyboard 200 may be mounted on an object, such as a ball having various shapes. For this purpose, FIG. 3 shows a fastener 350, such as a threaded screw, which is used to attach the keyboard to housing 360 of the desired object (e.g., ball). In one embodiment, and during assembly, the keyboard is mounted from the inside wherein the fastener 350 is placed in a rigid hemispherical structure, such as plastic. Once keyboard is mounted to the structure, a self-skinning material (such as a urethane cover) is used to provide an exterior layer of the housing 360.

Figure 4:
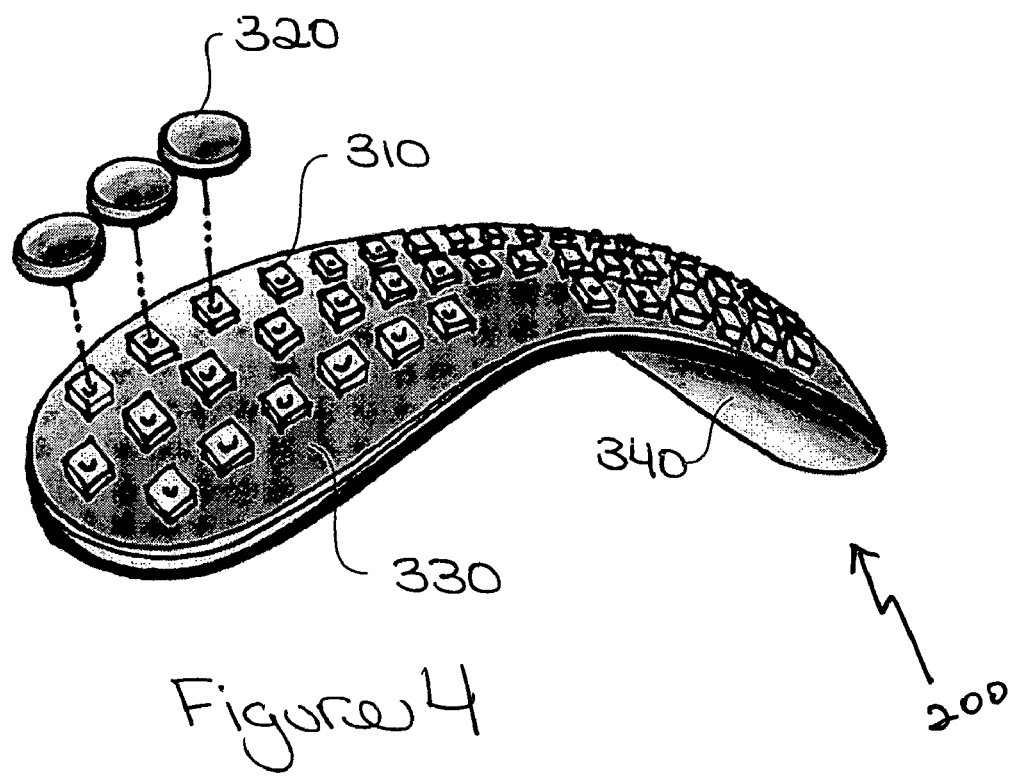
FIG. 4 is a perspective view of the keypad in accordance with embodiments of the present invention.

FIG. 4 is a perspective view of the overall keyboard of FIG. 3, when or prior to mounting to the housing. As shown in FIG. 4, the keyboard 200 is contoured into a convex shape to fully align with contours of the desired object for placement into the housing, as illustrated above. The degree of convexity of the keyboard is selected in a way to allow full alignment along the exterior shape of the desired object, without substantially sacrificing the comfort necessary to allow a user to operate the keyboard with convenience. The keycaps 320 may be assembled onto respective key switches 310 using techniques well known in the art, e.g., by snapping or gluing.

Figure 5:
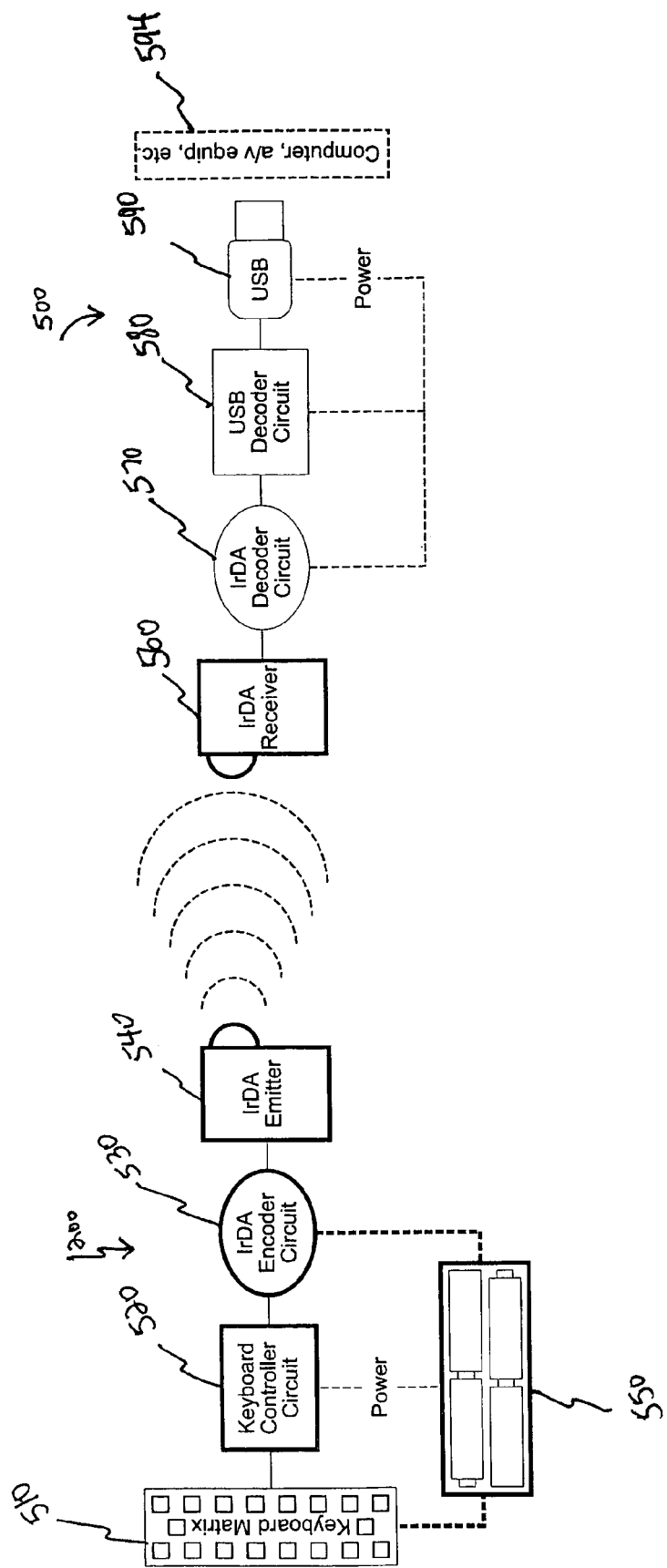
FIG. 5 is a functional block diagram of a keyboard using infrared (IR) transmission in accordance with one embodiment of the invention.

As indicated above, the keyboard 200 may be used as an input device to communicate instructions to a controlled device, such as a computer, television (TV), an organizer, cable box, satellite receiver, stereo equipment, or any other interactive device (hereinafter "controlled device") that may be controlled via an input device, such as a keyboard, mouse, and/or remote controller. FIG. 5 is a functional block diagram of an exemplary keyboard using infrared (IR) transmission in accordance with one embodiment of the invention. In this embodiment, the keyboard 200 comprises a keyboard matrix 510 for receiving input strokes from a user via the keys 310 (see FIGS. 3 and 4). The keyboard matrix 510 converts each of such mechanical strokes into an electrical signal under the control of a controller circuit 520. For example, when a user presses a particular key 310 on the keyboard 200, an electrical connection is made, which causes the keyboard matrix 510 to send a signal to the controller circuit 520 telling it what key or keys were pressed. The controller circuit 520 may comprise a microprocessor, which controls the operation of the keyboard 200. Additionally, the keyboard 200 may comprise a read-only memory (not shown in this figure) that holds instructions to run the microprocessor, similar to the system basic input output system (BIOS) code on a computer motherboard. If programmability is desirable, the keyboard 200 may also comprise an erasable programmable read-only memory (EEPROM) to hold programming information.

Th controller circuit 520 is configured to sense the raw signals created by the switches 310 as they make electrical contact, and translates them into codes or signals that may be sent to an IR station 500 of a controlled device 594. The controller circuit 520 also handles the actual interfacing between the keyboard 200 and communication hardware, e.g., an infrared (IR) encoder 530 for transmission by an IR emitter 540. The controller circuit 520 identifies which key is actually pressed. When a specific key is pressed, the keyboard matrix 510 generates a signal for the row and column assigned to that key. The circuit controller 520 is programmed to know that for each key. To avoid multiple keystroke registration, a circuitry that is well known in the art may be used in the keyboard's wiring to ensure that a single keypress will not result in multiple keystrokes being registered. After the keystroke has been registered, the controller circuit 520 generates a predetermined code to indicate what has been pressed. This is sometimes referred to as a scan code.

The IR link may provide between the controlled device 594 and the keyboard 200 a full bi-directional serial communications link, with its own protocols and commands. The IR transmission may conform to any IR standard, such as those defined by the Infrared Data Association (IrDA). The IR emitter may comprise an infrared emitting diode in series with a current limiting resistor (not shown in this figure). In one embodiment, the IR station may employ a Serial Infrared Transceiver (e.g., TFDU4100), manufactured by Vishay Semiconductor.

As noted above, the controller circuit 520 is also electrically connected to the IR encoder 530, which is configured to encode the identified keystroke, which typically is a baseband signal, into an IR carrier signal for transmission to an IR receiver 560 at the controlled device 594. In this embodiment, an internal power source 550 is used to power such internal components of the keyboard to operate, since this embodiment of the keyboard 200 is detached from and cannot be powered from the controlled device 594. In one embodiment, the power source may comprise a 3 Volt of direct current (DC), and a current of about 15 milli-amperes (mA), e.g., by using 2 AA alkaline or rechargeable batteries. Of course, the keyboard 200 may be powered directly by the controlled device 594 in an embodiment wherein the keyboard 200 is wired to the controlled device 594. For example, the keyboard 200 may be configured to take power from the controlled device 594, e.g., from the motherboard of a PC. Thus, two of the wires running through a keyboard cable (not shown in this figure) carry power and ground signals from the motherboard to the keyboard. This is usually a +5 volt signal, the standard for many devices within the PC. Typically, the presence of LED indicators on the keyboard 200 verifies that power is being provided to the components. Other batteries or power sources providing greater or less power may be used as well.

IR keyboards are characterized by their use of IR light with a wavelength of typically 950 nm as a medium to transfer the data. Of course, the invention may be used with any IR wavelength that is appropriate for transmitting information codes or signals to the IR receiver 560. When using IR light, the user considers the working angle of the keyboard to ensure that transmission of the IR light is substantially along the line of sight with the IR receiver 560. In one embodiment, it is desirable to have the user point the IR emitter 540 towards the receiver 560. It is possible that the IR receiver 560 to have sufficient sensitivity to receive and detect weaker signals, e.g., those signals reaching the receiver indirectly via reflections on walls or ceilings. For example, the IR receiver 560 may be selected to accept signals arriving from an IR emitter 540 at an angle of arrival of 0 to 45 degrees to a line that is normal to the surface of the IR receiver 560, and from a distance of up to 10 or more feet. The use of IR as the medium of transmission offers a benefit with respect to maintaining a relatively secure data transmission. More particularly, unauthorized emitters located away from or out of the line of sight of the IR receiver 560 cannot transmit data and interfere with the operation of the IR receiver 560.

Upon receiving the signals from the IR emitter 540, the IR station 500 performs steps similar to those performed at the keyboard 200, but in reverse order. That is, the IR receiver 560 provides the received IR signal to an IR decoder 570 for decoding the IR signal from the carrier into a baseband signal representative of the key pressed by the user. The decoder 580 provides the decoded signal to another circuit, e.g., universal serial bus (USB) decoder 590, which interfaces with the controlled device 594. Other interfaces known in the art may be used, such as a PS/2, RS-232, etc. In this embodiment, the USB decoder 580 is configured to transform the IR decoded signal into a signal conforming with the USB 1.0 or hi-speed USB 2.0 standard. As shown in this embodiment of FIG. 5, the IR station 500 is located outside the controlled device 594, and interfaces with the controlled device 594 via a USB connector 590. However if desired, the IR station 500 may be embedded into the controlled, device 594 and, in that case, no USB connector is required. In either embodiment, the IR station 500 may be preferably powered from the controlled device 594, or may be equipped with an independent power source.

Figure 6:
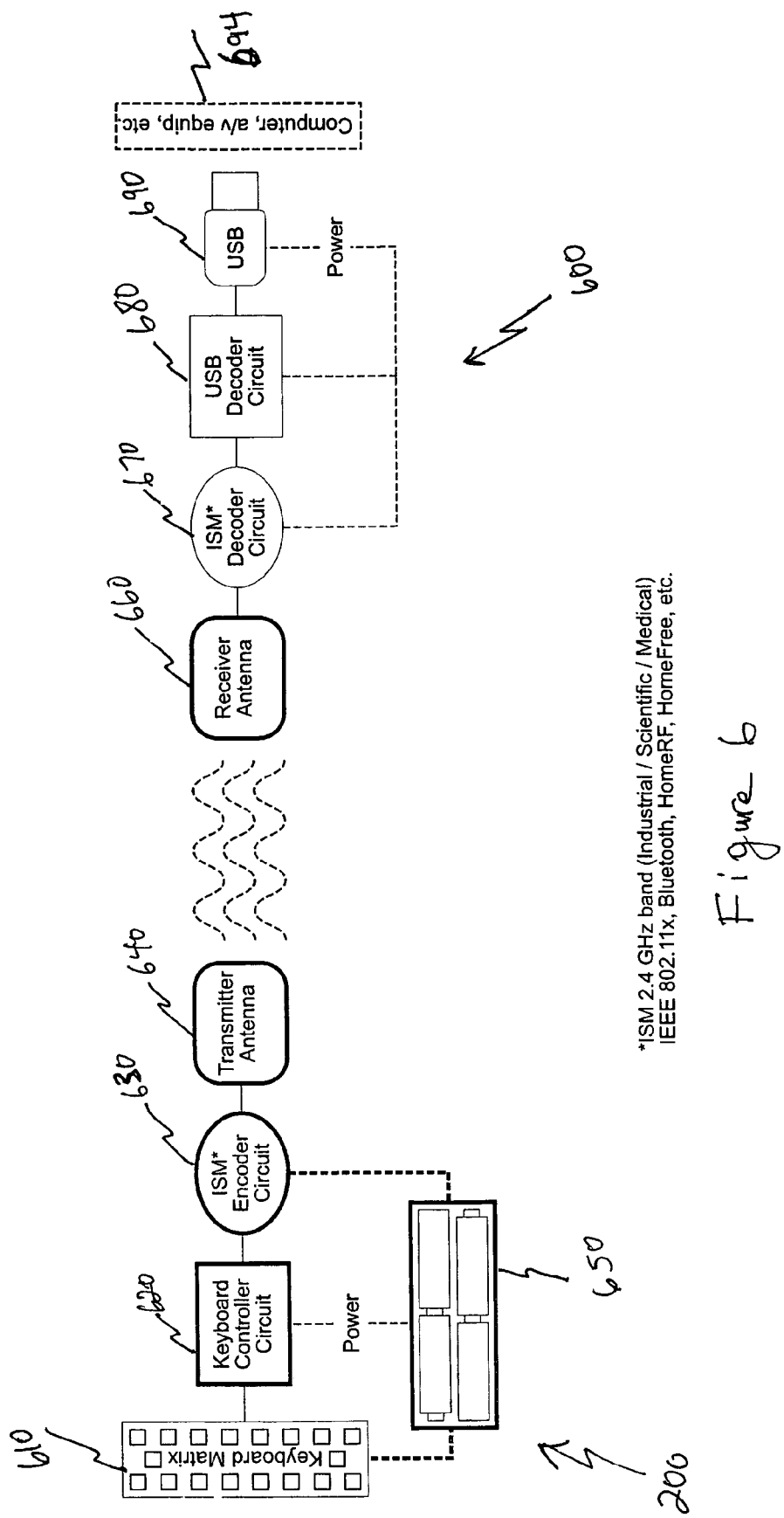
FIG. 6 is a functional block diagram of a keyboard using radio frequency (RF) transmission in accordance with one embodiment of the invention.

FIG. 6 shows a functional block diagram of another embodiment of the keyboard 200 using radio frequency (RF) transmission as the communication medium between the keyboard 200 and an RF receiver 600. In this embodiment, the frequency band used for transmitting RF signals is the Industrial, Scientific, and Medical band (between 2.4 GHz and 2.835 GHz), often referred to as 2.4 GHz ISM band. In view of this disclosure, one of ordinary skill in the art will appreciate that other RF bands may be used, provided that such RF band and power is appropriate for use in short range communications, such as at home, in an office, or in a hotel room. In this embodiment, either frequency-hopping spread spectrum (FHSS IEEE802.11) or direct-sequence spread spectrum (DSSS IEEE802.11b or g or later versions) technology may be used. In a preferred embodiment, it is desirable to use FHSS for low-cost low-power low-range low-data-rate applications, including Bluetooth, HomeRF (SWAP), 2.4 GHz DECT (digital European cordless telephone), and FHSS IEEE802.11 standards, all versions of which, that are available as of the filing date of this application, are incorporated herein in their entirety by reference. Bluetooth applications are directed at a data transfer, such as transferring an e-mail message from a cell phone to a PDA, and support data rates up to 721 kbps. HomeRF supports both data and voice transmission, and allows data rates up to 1.6 Mbps. The 2.4 GHz DECT is intended for 2.4 GHz cordless phones with a data rate of 552 kbps. IEEE802.11 FHSS systems currently support data rates up to 1.6 Mbps, but a recent 5-MHz channel bandwidth allocation, wideband FH, allows symbol rates up to 10 Mbps.

For FHSS, the 2.40 GHz to 2.835 GHz ISM band is broken into 75 MHz channels, with a 2 MHz lower guard band and a 3.5 MHz upper guard band. FHSS is based on time division multiple access (TDMA), with the number of frequency hops per second varying from one standard to another. Bluetooth and DECT utilize Gaussian frequency-shift keying (GFSK) modulation, whereas HomeRF and FHSS 802.11 use 2-level and 4-level frequency-shift keying (FSK).

As shown in FIG. 6, the keyboard 200 comprises a keyboard matrix 610 connected to a controller circuit 620, which is connected to an ISM encoder 630. The functions of these components are generally equivalent or similar to those components of the system of FIG. 5, except for the ability to operate in the ISM band as the communication medium. If desired, the controller circuit 620 may implement an error-correction algorithm suitable for RF communication, such as bit error check, cyclic redundancy check, or other error corrections known in the RF field. For instance, the controller 620 is configured to identify a keystroke by the user of the keyboard matrix 610, and to generate a baseband signal representative of the keystroke to an ISM encoder 630. The ISM encoder 630 is configured to modulate the baseband signal onto an RF carrier signal for transmission by a transmit (TX) antenna 640. In one embodiment, the ISM encoder 630 may use amplitude shift key (ASK) or frequency shift keying (FSK) for modulating the baseband signal. Since ISM band is used in this embodiment, an advantage is realized in that the TX antenna 640 may comprise a relatively smaller antenna such as a loop antenna, which can be wires printed on a printed circuit board (PCB). With such a small antenna, the TX antenna 640 can be fully housed inside the housings depicted in any of FIGS. 1A through 2D. In this embodiment, the keyboard 200 comprises a power source 650, which may include 2 AA batteries for supplying a 3.0V DC to the keyboard 200. Of course, other batteries or power sources providing greater or less power may be used as well.

At the receiving end, the RF receiver 600 comprises a receive (RX) antenna 660, which is configured to receive RF signals from the TX antenna 640. The RX antenna 660 provides an ISM decoder 670 with the received RF signals for demodulation into baseband signals, using a demodulation technique in conformance with ASK or FSK schemes noted above. In this embodiment, the RF receiver 600 further comprises a USB decoder 680 which is configured to process the baseband signals into signals in accordance with the interface medium, e.g., USB, used between the RF receiver 600 and a controlled device 694. As noted in connection with FIG. 5 above, the RF receiver 600 may be embedded within or placed externally to the controlled device 694. In this embodiment, the RF medium allows communication between the keyboard 200 and RF receiver 600 without restrictions to line-of-sight reception, since RF signals can penetrate walls and bounce off objects while still being receivable by the RF receiver 600. In yet another embodiment, the keyboard 200 may communicate via a Diamond Multimedia HomeFree link, which is commercially available. In one embodiment, the invention may employ a Bluetooth compliant or qualified device manufactured by Cambridge Silicon Radio of the U.K.

Yet in another embodiment, the keyboard 200 may be designed using both IR and RF (discussed above) capabilities to permit usage of the keyboard 200 in a dual mode. In such an embodiment, the keyboard 200 may advantageously permit a user to use the keyboard 200 at a location that is within the line of sight from the receiver or from a distant location, e.g., through physical obstructions. The keyboard 200 may be used in both modes (IR and RF simultaneously). Alternatively, a user-selector switch may be provided on a side, upper or lower surface of the keyboard 200 to permit a user to switch between IR and RF modes. The selector switch allows usage in only one of the two modes, thereby saving power consumption and avoiding possible signal interference from one mode to the other. To accommodate for the use of multimedia services, the keyboard 200 may be optionally equipped with one or more built-in or connectable auxiliary device (e.g., a video camera and/or screen, and audio microphone and/or speaker). In such a configuration, the wireless link will be selected to accommodate for the transmission of data, audio, and video information.

FIG. 7 illustrates a usage of the keyboard in accordance with one embodiment of the invention. As shown in FIG. 7, a user may horizontally rest the keyboard 200 (e.g., the keyboard mounted on a football) on his/her lap, while cushioned by the lower surface 240 of the keyboard 200. The keyboard 200 may also be used in a vertical fashion wherein a palm of one hand of the user surrounds one surface (e.g., lower surface 240), and a palm of the other hand of the user surrounds another surface of the football (not shown in this figure). In such a use one or more fingers may be used to strike the keys of the keyboard 200 as both palms surround or "hug" the football.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. An apparatus for communicating data to a detached device, the apparatus comprising:
    an alphanumeric keyboard comprising a plurality of keys, the keyboard having a lower surface, the keyboard being configured to communicate data representative of alphanumeric information to the device; and
    an object attached to the keyboard along at least a portion of the lower surface of the keyboard, the object being adapted for providing a cushioned region between the keyboard and a resting place,
    wherein the object comprises one of a football, soccer ball, volleyball, basketball, and rugby ball.

2. The apparatus of claim 1, wherein the object comprises a housing configured to contain substantially the entire lower surface of the keyboard so that the plurality of keys are exposed to a user.

3. The apparatus of claim 2, wherein the housing comprises a substantially V-shaped lower surface having a lower peak that is configured to align, at least in part, with contours of two thighs or fit, at least in part, within the lap region of a human body.

4. The apparatus of claim 2, wherein the housing comprises within it a material suitable for cushioning, the material including at least one of air, cotton, polyester, silicone, rubber, resin, straw, wooden pieces, and combinations thereof.

5. The apparatus of claim 1, wherein the object is at least partially inflated with a suitable gas.

6. The apparatus of claim 1, wherein the object is configured to be held between palms of two hands while keeping at least some fingers of the two hands free to operate at least one of the plurality of keys.

7. The apparatus of claim 1, wherein the keyboard comprises a wireless transmitter configured to communicate to a wireless receiver a signal representative of, at least in part, a key pressed by a user.

8. The apparatus of claim 7, wherein the wireless transmitter comprises at least one of an infrared (IR) emitter and an RF transmitter, and the wireless receiver comprises one of an IR receiver and an RF receiver.

9. The apparatus of claim 7, wherein the wireless transmitter is configured to transmit signals in the Industrial, Scientific, and Medical (ISM) band.

10. The apparatus of claim 7, wherein the wireless transmitter comprises an RF transmitter and IR emitter.

11. The apparatus of claim 10, further comprising a selector switch configured to switch the transmitter between one of RF and IR transmission modes in accordance with the capability of the wireless receiver.

12. The apparatus of claim 1, wherein the detached device comprises at least one of a personal computer (PC), television (TV), an organizer, cable box, satellite receiver, and radio or stereo equipment.

13. The apparatus of claim 1, wherein the alphanumeric information comprises data representative of a Latin-based alphabet.

14. The apparatus of claim 1, wherein the keyboard comprises a transmitter configured to communicate at least one alphanumeric symbol to the detached device in response to a user's strike of a key of an alphanumeric key on the keyboard.

15. The apparatus of claim 14, wherein the detached device is configured to display the at least one alphanumeric symbol on a screen.

16. The apparatus of claim 1, further comprising at least one of a microphone and a camera configured to capture audio and video data, respectively, from a source associated with the location of the keyboard, and further comprising at least one of a speaker and a display configured to receive audio and video information, respectively, from a source associated with the location of the detached device.

17. A method of making an alphanumeric keyboard, the method comprising:
   configuring a transmitter to communicate data representative of alphanumeric information to a detached device;
   connecting the transmitter to the alphanumeric keyboard;
   attaching a cushioned object to at least a portion of a lower surface of the alphanumeric keyboard; and
   selecting the cushioned object to have a shape resembling a toy or sport object, wherein the toy or sport object comprises one of a soccer ball, football, basket ball, and a volley ball.

18. The method of claim 17, further comprising configuring the transmitter to communicate the data via at least one of IR, RF, and wired links.

19. The method of claim 17, further comprising configuring the transmitter to cause at least one alphanumeric character to be displayed on a screen associated with the detached device.

20. The method of claim 17, further comprising operationally connecting a selector switch to the transmitter to select at least one mode of communication, the mode being selected from IR, RF, and wired media.

* * * * *